United States Patent
Shani et al.

(10) Patent No.: US 10,715,288 B2
(45) Date of Patent: Jul. 14, 2020

(54) WIRELESS LOCAL AREA NETWORK SOUNDING PROTOCOL

(71) Applicant: Apple Inc., Cupertino, CA (US)

(72) Inventors: Oren Shani, Saratoga, CA (US);
Guoqing Li, Campbell, CA (US);
Joonsuk Kim, Saratoga, CA (US);
Ashok Ranganath, San Jose, CA (US)

(73) Assignee: Apple Inc., Cupertino, CA (US)

( * ) Notice: Subject to any disclaimer, the term of this patent is extended or adjusted under 35 U.S.C. 154(b) by 100 days.

(21) Appl. No.: 15/590,960

(22) Filed: May 9, 2017

(65) Prior Publication Data

US 2017/0331605 A1    Nov. 16, 2017

Related U.S. Application Data

(60) Provisional application No. 62/334,339, filed on May 10, 2016.

(51) Int. Cl.
*H04L 5/00* (2006.01)
*H04L 25/02* (2006.01)
(Continued)

(52) U.S. Cl.
CPC ......... *H04L 5/0048* (2013.01); *H04B 7/0632* (2013.01); *H04L 5/0037* (2013.01);
(Continued)

(58) Field of Classification Search
CPC .. H04B 1/7115; H04B 7/0452; H04B 7/0617; H04B 7/0643; H04B 7/0632;
(Continued)

(56) References Cited

U.S. PATENT DOCUMENTS

| | | | |
|---|---|---|---|
| 6,680,967 B1 * | 1/2004 | Westman | H04B 1/7115 375/144 |
| 2005/0170781 A1 * | 8/2005 | Jacobsen | H04L 1/0001 455/67.11 |

(Continued)

OTHER PUBLICATIONS

Stacey, Robert; IEEE P802.11 Wireless LANs—Specification Framework for TGax; doc.: IEEE 802.11-15/0132r8; Sep. 22, 2015; 22 pgs.

(Continued)

*Primary Examiner* — Harun Chowdhury
(74) *Attorney, Agent, or Firm* — Dickinson Wright RLLP

(57) ABSTRACT

An access point (AP) in a wireless local area network (WLAN) uses a protocol to determine frequency/time resource allocations of resource units (RUs) in parallel with data transfer to and from WLAN stations (STAs). The AP generates a sounding table associating STAs with RUs for uplink (UL) and downlink (DL). The AP processes the sounding table to create a channel map table and then the AP allocates particular RUs to particular STAs. The STAs then receive and transmit data from and to the AP over the allocated RUs. This approach achieves good throughput while reducing the use of signaling and pilot overhead associated with channel sounding. To avoid interruption of ongoing transmissions, a newly arriving STA is grouped and sounded with other STAs. The protocol includes a joint sounding and data epoch followed by a determination of the channel map table.

20 Claims, 6 Drawing Sheets

(51) Int. Cl.
*H04W 72/04* (2009.01)
*H04B 7/06* (2006.01)
*H04W 84/12* (2009.01)

(52) U.S. Cl.
CPC ........ *H04L 5/0062* (2013.01); *H04L 25/0206* (2013.01); *H04W 72/04* (2013.01); *H04L 5/0057* (2013.01); *H04W 84/12* (2013.01)

(58) Field of Classification Search
CPC ... H04L 1/0001; H04L 5/0007; H04L 5/0037; H04L 5/0053; H04L 1/0025; H04L 5/0048; H04L 5/0062; H04L 25/0206; H04W 72/04
USPC ........ 370/252, 329, 330, 336; 375/144, 260, 375/267
See application file for complete search history.

(56) References Cited

U.S. PATENT DOCUMENTS

2014/0269964 A1* 9/2014 Du ................. H04B 7/0452
375/267
2014/0348011 A1* 11/2014 Zirwas ................. H04L 1/0025
370/252
2015/0146807 A1* 5/2015 Zhang ................. H04L 5/0007
375/260

OTHER PUBLICATIONS

Stacey, Robert, et al.; IEEE P802.11 Wireless LANs—Proposed TGax draft specification; doc.: IEEE 802.11-16/0024r1; Mar. 2, 2016; 160 pgs.

* cited by examiner

WIRELESS LOCAL AREA NETWORK SOUNDING PROTOCOL

CROSS-REFERENCE TO RELATED APPLICATION

This application claims benefit of U.S. Provisional Patent Application No. 62/334,339, entitled "WIRELESS LOCAL AREA NETWORK SOUNDING PROTOCOL," filed on May 10, 2016, which is hereby incorporated by reference.

FIELD

The described embodiments relate generally to multiple access wireless communications using electronic devices, including systems and techniques for obtaining wireless local area network (WLAN) uplink (UL) and downlink (DL) channel soundings in parallel with performing data transfers in order for a WLAN access point (AP) to determine UL and DL resource allocations among several WLAN stations (STAs).

BACKGROUND

IEEE 802.11ac provides an arrangement for channel estimation of the multiple downlink channels from an AP to multiple STAs. The channel estimation involves a process called sounding. Various schemes can be used to perform sounding. For example, an AP can transmit a Null Data Packet-Announcement (NDP-A). The NDP-A contains the addresses of particular STAs to which the AP wishes to transmit data. The NDP-A is followed by a Null Data Packet (NDP). The NDP represents pilot energy; that is, a pre-defined pattern. Each STA addressed by the NDP-A measures the downlink wireless channel from the AP to itself. The channel measurement is possible because the given STA knows the pre-defined pattern and can estimate the effects of the channel on that pattern (for example, amplitude attenuation, carrier phase rotation, and time delay). The various STAs feedback their channel measurements, and then the AP has knowledge of the wireless channels from the AP to the STAs.

However, NDP-A and NDP messages and similar sounding management and pilot messages create an overhead. That is, these sounding-specific messages consume both bandwidth and energy. There is a tradeoff between placing energy into pilot signals and placing that energy into medium access control (MAC) data frames. For a shared medium every transmission of energy is potentially communication-limiting to some other unrelated simultaneous transmission.

SUMMARY

Representative embodiments set forth herein disclose various systems and techniques for obtaining UL and DL channel estimates in parallel with performing data transfers in order to determine UL and DL resource allocations among several STAs. The parallel characteristic of embodiments described herein reduces transmission of sounding signaling messages and of sounding pilot signals.

In one multiple access scenario using a shared wireless medium, there are multiple STAs in communication with an AP. The shared wireless medium appears as a different wireless channel between each STA and the AP. For STAs with two or more antennas, the wireless medium appears, generally, as a different wireless channel for each antenna. In order to transfer UL data from the STAs to the AP and DL data from the AP to the STAs, it is beneficial to determine UL and DL resource allocations based on knowledge of the wireless channels between the AP and the STAs. The knowledge of the wireless channels can be expressed in terms of channel estimates. In general, a channel estimate can comprise a signal to noise ratio (SNR), received signal strength indication (RSSI), channel state information (CSI) and/or a channel quality. The channel estimates can be obtained by processing received data frames and/or by measuring received signal strength to provide an RSSI. Generally, the wireless channels and/or associated interference change with time, so the knowledge of the wireless channels is refreshed periodically to re-determine UL and DL resource allocations for the STAs. The channel knowledge, in some embodiments, is processed to generate a channel map on which the resource allocations are based.

In order to reduce overhead associated with obtaining the channel map, the channel knowledge is obtained while performing data transfers in the UL and/or DL directions. The protocol includes a joint sounding and data epoch. During the joint sounding data epoch, channels are sounded while data is being transferred. The data, in some embodiments, is voice data, multimedia data, image data, web browser data, and/or file transfer data.

For example, the AP can estimate the channel from a given STA based on a reception of a MAC frame from the STA. A MAC frame commences with a preamble; the AP can estimate the UL channel from the STA based on the received preamble, using, for example, a correlation technique or a least squares technique. A given STA can estimate a DL channel (the channel from the AP to the STA) based on a received MAC frame. The received DL MAC frame contains a preamble and, similarly to operation at the AP on a received uplink MAC frame, the given STA can estimate the DL channel by processing the preamble portion of the received DL MAC frame. The STA stores this estimate and, in some embodiments, refines it or replaces it as additional DL MAC frames are received.

In some system configurations, the AP and the STA are transmitting in the same frequency bands, but at different times. Because of reciprocity, the channels are the same (in a linear system or in an impulse response sense) in the same frequency band regardless of whether the AP or the STA transmitted the wireless energy observed by the other. However, interferers may be present physically near the STA yet not perceived in received signals at the AP due to distance or shadowing. Because the channel estimates and/or the CSI values include the effects of interference, generally, measurements for both UL and DL are obtained even for the same particular frequency band.

In some embodiments, the AP sends a request frame to the given STA asking that the channel estimate and/or CSI obtained by the given STA be reported to the AP. The given STA then quantizes or encodes the channel estimate from storage and piggy-backs it along with UL data to the AP in a subsequent UL MAC frame transmission, i.e., the channel estimate and UL data are sent in the same frame. A frame holding both channel estimation data and other data may be referred to as a composite frame.

In some scenarios, a STA will arrive in the vicinity of the AP after a joint sounding and data epoch has commenced. The already-present STAs may be referred to as incumbent STAs. The AP will acquire knowledge of the wireless channel associated with the arriving STA. The AP, in some embodiments, groups subsets of STAs for learning channels in parallel with data transfer. That is, in order to minimize a loss of transmission opportunities with the incumbent STAs (for whom channel estimates and resource allocations have previously been established) the AP will establish channel estimates and exchange data with the arriving STA during the same joint sounding and data epoch while refreshing channel estimates and performing data transfer related to the incumbent STAs. After the joint sounding and data epoch is complete, the AP assigns UL and DL resource allocations according to the fresh wireless channel knowledge, and commences to transfer data with the group of STAs during a data epoch. When an estimated channel coherence time approaches, the AP initiates another joint sounding and data epoch to refresh knowledge of the wireless channel.

The piggy-backing creates a composite message with both UL data and the quantized DL channel information. By estimating the UL channel using a received UL data frame and benefiting from a composite message on the UL, the transmission or bandwidth cost associated with obtaining the DL channel by the AP is balanced by the benefit of the STA receiving DL data and the AP receiving UL data during the channel sounding process.

In some instances, the wireless medium is changing frequently or constantly. Channel knowledge is thus eroding or decaying as time advances. To compensate for this, the interval from determining one set of channel estimates for a given set of wireless channels to determining another set of channel estimates for the same set of wireless channels is sufficiently brief so that the set of channel estimates in use is still beneficial, even if imperfect. This interval is related to the coherence time of the wireless channels. Some STAs will be in motion or may have reflecting or shadowing scatterers in their vicinity that are in motion. Wireless channels associated with those STAs will change at a commensurate rate. In some embodiments, a refreshing of the wireless channel knowledge is performed at a pace to keep up with such motions. For example, a refresh period or update interval is approximately upper-bounded by the channel coherence time. The channel coherence time depends on the band of frequencies in use and the geometry and motion of the scatterers, STAs, and AP. The characteristic of geometry refers to the physical size, shape and separation in space of the scatterers, STAs and AP.

IEEE 802.11 supports several bandwidths, for example, 20 MHz, 40 MHz, 80 MHz and 160 MHz. While some examples provided herein are based on a 20 MHz bandwidth, STAs may also be grouped by 40 MHz, 80 MHz, and 160 MHz bandwidths, and such bandwidths greater than 20 MHz fit more than nine STAs at a time. Nine STAs is the maximum for a 20 Mhz bandwidth. The AP, in some embodiments, identifies a first set or group of STAs to communicate on a given 20 MHz bandwidth and a second set or group of STAs to communicate on another 20 MHz bandwidth. The AP, in some embodiments, periodically initiates a joint sounding and data epoch on the given 20 MHz bandwidth and separately initiates another joint sounding and data epoch on the other 20 MHz bandwidth at an unrelated time. Generally, the coherence time on the given 20 MHz and the coherence time on the other 20 MHz bandwidth will be different.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
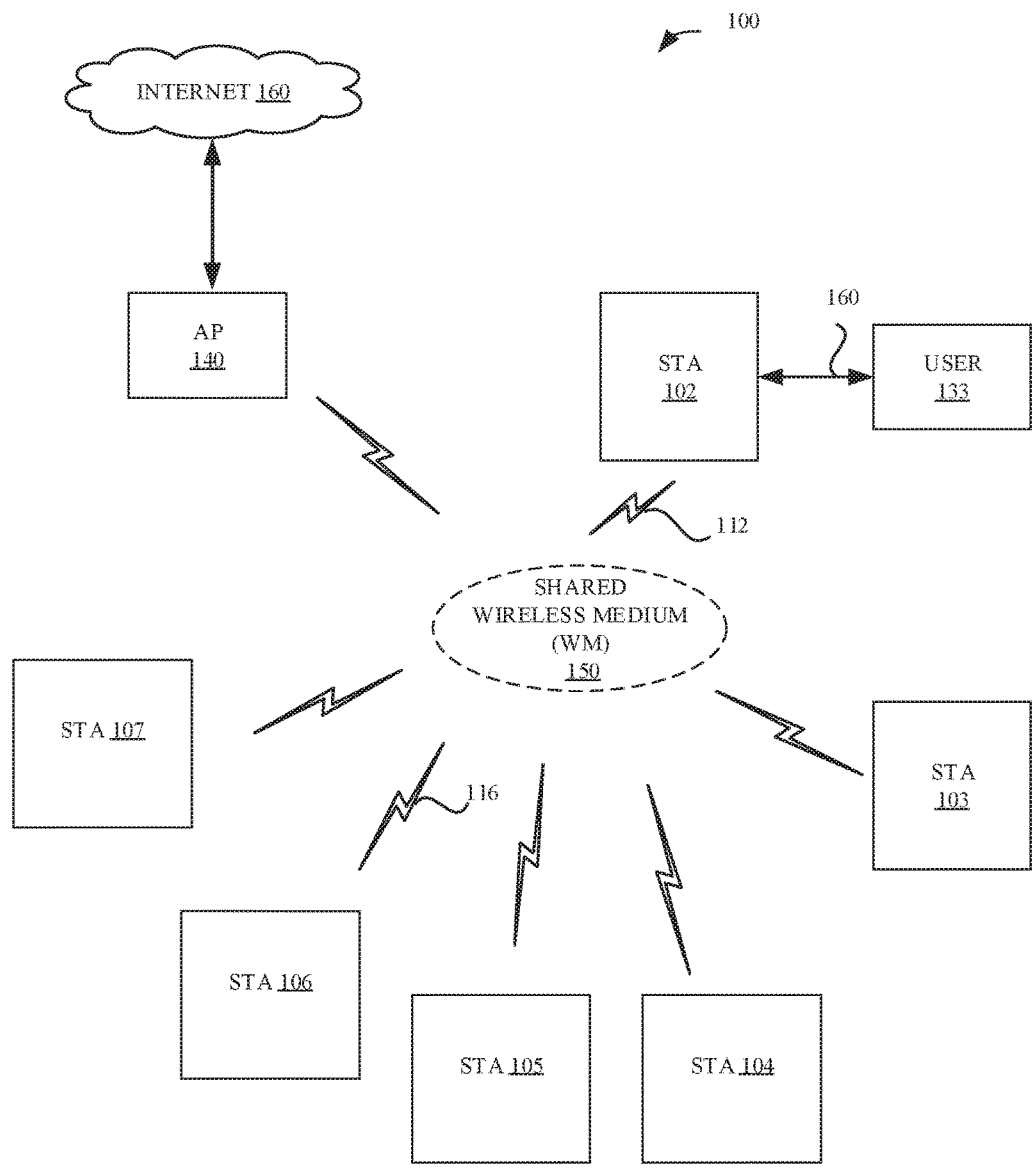
FIG. 1 illustrates an exemplary WLAN system including an AP and several STAs, according to some embodiments.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

A network referred to as a basic service set (BSS) is the basic building block of an IEEE 802.11 WLAN. Two STAs that belong to a BSS are able to communicate directly. An AP is any entity that has STA functionality and enables access to an architectural component referred to as the distribution system (DS) in the IEEE 802.11 standard. By means of an AP, a given STA can communicate with entities outside of a coverage area of a BSS to which it belongs. The primary channel is a common channel of operation for all STAs that are members of the BSS. A beacon is a recurring time-related management frame message sent from an AP.

Furthermore, a STA can buffer data before transmission. This data is typically referred to as traffic. In general, there can be more than one kind of traffic, and therefore, more than one buffer in a STA. Additionally, there may be different urgencies or delay-tolerances (which are sometimes referred to in general as quality of service or QoS) associated with the different buffers. Prompt establishment of channel access is needed for many traffic types.

The IEEE 802.11 standard also defines various PHY services. More than one PHY is defined within the standard. Each PHY can include a physical layer convergence procedure (PLCP) layer and a physical medium dependent (PMD) function. The PMD defines methods of transmitting and receiving data through a WM between two or more STAs.

An amendment to IEEE 802.11 known as IEEE 802.11ac provides for multi-user multiple input, multiple output (MU-MIMO) techniques. In the MU-MIMO of IEEE 802.11ac, an AP or STA with more than one antenna transmits a PPDU to multiple receiving STAs over the same radio frequencies and each receiving STA simultaneously receives one or more space-time streams. IEEE 802.11ac includes primary channel bandwidths of 20 MHz, 40 MHz, and 80 MHz and a secondary 20 MHz channel. The secondary 20 MHz channel may also be referred to as a secondary channel. The primary channel and the secondary channel may be used together. Several frequency topologies are possible. IEEE 802.11ac includes definitions of high throughput (HT) PPDUs and very high throughput (VHT) PPDUs.

One PHY in IEEE 802.11 is orthogonal frequency-division multiplexing (OFDM) using subcarriers modulated with various levels of quadrature amplitude modulation (QAM) and binary phase shift keying (BPSK) in some cases. Orthogonal frequency division multiple access (OFDMA) is planned based on an amendment to IEEE 802.11. Certain aspects of OFDMA are described in the planned amendment to the IEEE 802.11 standard known as "IEEE 802.11ax." "Specification Framework for TGax, doc.: IEEE 802.11-15/

0132r8," Sep. 22, 2015 (hereinafter "IEEE 802.11ax Framework"), is a standards framework document that outlines planned topic areas for the development of IEEE 802.11ax. Several features of IEEE 802.11ax are devoted to high efficiency (HE) and so some MAC definitions in IEEE 802.11ax have a suffix of "HE." Subsequent to developing the IEEE 802.11ax Framework, the IEEE published "Proposed TGax draft specification," Mar. 2, 2016 (hereinafter "IEEE 802.11ax draft specification"). In the IEEE 802.11ax draft specification, a STA may support DL and UL OFDMA. In an MU-MIMO RU, there may be support for up to eight users with up to four space-time streams per user up to a limit.

The IEEE 802.11ax Framework provides for 20 MHz, 40 MHz, and 80 MHz OFDMA tone plans based on resource units (RUs). A tone is an OFDM subcarrier. Each RU can include, for example, 16, 52, 106, 242, 484, or 996 tones, depending on the bandwidth of the OFDMA tone plan and the number of RUs in the plan. A STA transmitting over a 20 MHz OFDMA tone plan can be referred to as transmitting over a 20 MHz channel. An AP transmitting over first and second 20 MHz OFDMA tone plans can be referred to as transmitting over first and second 20 MHz channels. Because OFDMA is a multiple access scheme, an AP transmitting over a 20 MHz channel can be addressing one, two, or more recipient STAs simultaneously over the 20 MHz channel using different RUs. Also, using MU-MIMO, an AP can address two or more STAs using a single RU, for example, at the same time.

A STA may include a station management entity (SME), a MAC layer management entity (MLME) and a physical layer management entity (PLME). Moreover, the layers and devices can communicate with each other with standardized primitives defined at service access points (SAPs). Single units of data and/or control information within a layer are called protocol data units (PDUs). For example, a PDU at the physical layer convergence procedure (PLCP) layer is referred to as a PPDU.

The IEEE 802.11 MAC layer provides access to the WM via a distributed coordination function (DCF). The main access mechanism of IEEE 802.11 is a DCF known as carrier sense multiple access with collision avoidance (CSMA/CA). For a STA to transmit, it senses the medium to determine if another STA is currently transmitting. When a first STA is not able to sense the presence of a second STA using CSMA/CA, the second STA is referred to as hidden with respect to the first STA. If the STA sensing the WM finds the WM to be busy, it defers attempting to transmit until the end of the current transmission. Prior to attempting to transmit, the STA selects a random backoff interval and decrements a backoff interval counter while the WM is idle. After the backoff interval counter reaches zero, if the WM is still idle, the STA can transmit. In order to further reduce the probability of collision on the WM (for example, transmission collision with a hidden STA), short control frames known as Request to Send (RTS) and Clear to Send (CTS) can be used. These procedures of the IEEE 802.11 standard, including IEEE 802.11ac, may be referred to herein as shared WM protocol rules or as WM protocol rules.

Carrier sense can be performed both through physical and virtual techniques. The physical technique is known as clear channel assessment (CCA) and can include an energy measurement or received signal strength indicator (RSSI) measurement. The physical technique is referred to as sensing. The virtual CS mechanism, based on a state variable or value called the network allocation vector (NAV), is achieved by distributing reservation information announcing the impending use of the WM. The NAV provides a prediction of future traffic on the WM based on duration information that is announced in RTS/CTS frames prior to the actual exchange of data. The duration information is also available in the MAC header of many frames. Demodulating and recovering the data of an observed frame is referred to as receiving. The CS mechanism combines the NAV state and the STA's transmitter status with physical CS (CCA) to determine the busy/idle state of the medium. The NAV may be thought of as a counter which counts down to zero at a given rate. When the counter reaches zero or the NAV is reset, the virtual CS indication is that the channel is idle. When the counter is not zero, the CS indication is that the channel is busy.

Communication System

FIG. 1 illustrates a WLAN system 100 including an AP 140, STAs 102-107, and a shared wireless medium (WM) 150. The AP 140 is connected to the Internet 160. For the sake of illustration, the STA 102 interacts with a user 133 via an interface 160. Wireless channels of the WM 150 associated with the STA 102 and the STA 106 are indicated with the labels 112 and 116, respectively. In the allocation of RUs described herein, the AP obtains knowledge of the wireless channels between the various STAs and the AP. The AP then selects an RU corresponding to a set of subcarriers for which the attenuation between a given STA and the AP is low and the interference is low and/or an SNR associated with the selected subcarriers is expected to be high at the time the subcarriers corresponding to the RU are used. In other words, the AP desires to give each STA a selected RU for UL and/or DL transmission that is good for that STA, in the sense that the amount of error free bits which are able to be conveyed using the selected RU is high for a minimal investment of transmission energy. In general, a STA may be assigned or allocated one or more RUs.

For example, the channel indicated as 112 in FIG. 1 may exhibit interference energy from an uncoordinated transmitter at a first RU, but be free from the interference at a second RU. In this example, the second RU would be selected for allocation to the STA 102 for UL or DL transmission. In order to avoid signaling overhead, the AP would create a map of channels for each AP while minimizing the use of null data packets and null data packet announcement messages. In this way, data still flows on UL and DL channels while the AP is creating the map of channels. Particular selections from the map of channels can be referred to as an UL (or DL) resource allocation (or arrangement).

Joint Sounding and Data Epoch

Figure 2:
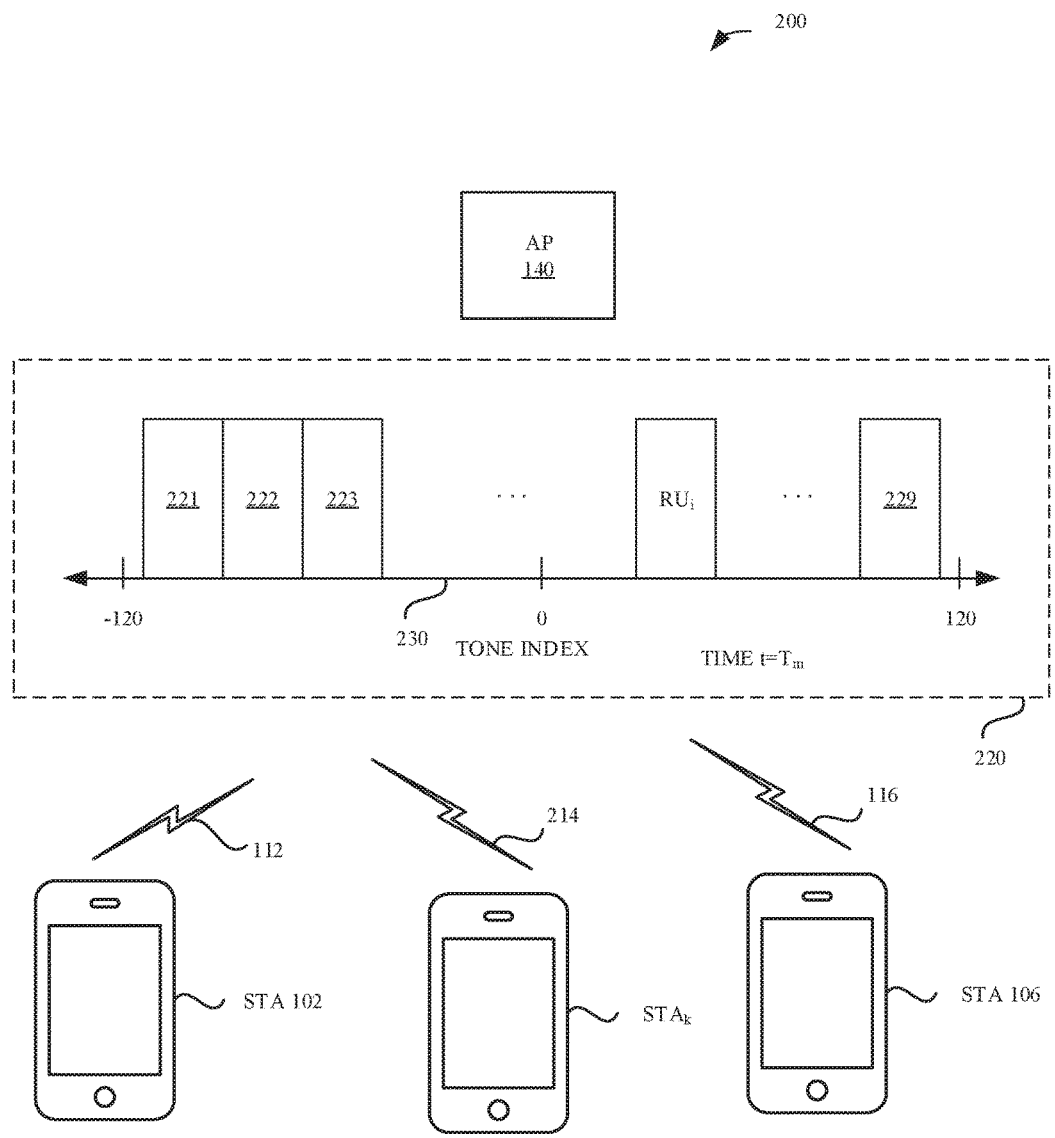
FIG. 2 illustrates an exemplary WLAN system of FIG. 1 including exemplary RUs available to be allocated to the STAs, according to some embodiments.

FIG. 2 provides further details of determining an UL and/or DL resource allocation. The AP 140 is shown in a system 200 generally communicating with STA 102, STA 106 and an arbitrarily labelled $STA_k$ (k can represent any of the STAs 102-107 of FIG. 1). An example RU allocation 220 comprising nine RUs 221 through 229 is shown for the purpose of illustration. The RU configuration 220 includes an $RU_i$ (in this example, $221 \leq i \leq 229$). The AP 140 will cycle UL and/or DL use of the RUs 221 through 229 to the STAs 102, 106, and k at a time interval beginning with a time $T_m$. Some degrees of freedom illustrated here are the RU index i, the STA index k, and the time index, m. A benefit of disclosed embodiments is providing a method for associating a proper RU (index i) with a given STA (index k) at a particular time (index m) without incurring undue sounding signaling overhead and pilot energy. An AP can develop a channel map during a joint sounding and data epoch. For example, the AP 140 determines, from a map of channels obtained during data transfers, that an $RU_i$ should be allocated to the $STA_k$ during a sounding interval beginning at a time $T_m$. The allocations will continue to be used as needed during a coherence time of the channel, which can be referred to as $T_{coherent}$. A data epoch is an interval after the sounding is complete but before the next sounding is needed. In embodiments disclosed herein, data is transferred in both epochs. Sounding is localized to the joint sounding and data epoch.

There is a tradeoff between the number of STAs the AP would like to sound versus the time it takes to complete the sounding of all RUs. The AP may sound one RU for a first STA and then sound the RU for a second STA until all channels associated with all STAs have been sounded for that RU (while transferring some data in parallel). Thus, an AP, in some embodiments, sounds a single RU in nine trigger frames over nine STAs for the RU configuration 220. Alternatively, the AP may sound nine RUs at a time for a STA with a single trigger frame. Alternatively, the AP may sound the nine RUs for the STA using enhanced distributed channel access (EDCA) based on an RTS message (which is full bandwidth). Alternatively, an AP could sound three STAs, each using three RUs, in three trigger frames. Alternatively, for a second example, the AP may sound three RUs for the first STA, and then sound those three RUs for the second STA. The AP may then commence a data epoch without further sounding. Alternatively, in the second example, the AP may continue a joint sounding and data epoch by sounding a second group of three RUs for the first STA and then sounding the second group of three RUs for the second STA. Third and additional STAs, in some embodiments, are coordinated in these sounding sequences.

In some implementations, if there is no data intended for a particular STA during a sounding and data epoch, the AP may nonetheless send null packets or acknowledgement frames or require null packets or acknowledgement frames be sent from the particular STA in order to populate the channel map with respect to the particular STA.

Arrival of a New STA

In order to alleviate interruption of the use of $RU_i$ by $STA_k$ when a new STA arrives (e.g., $STA_x$) in the vicinity of the AP 140, the STAs can be grouped for the purpose of sounding the channel during data transfers. $STA_k$ may be referred to herein as an incumbent STA because it was already present in the channel map at the time the new STA arrived. Because the AP 140 needs to move $STA_k$ off of $RU_1$ anyway, at a future time $T_{m+1}$, $STA_x$ can exchange data with the AP 140 over $RU_i$ while $STA_k$ is transferring data with the AP 140 over some other $RU_p$.

Possible RU Configurations

RU configuration 220 is one of several possible RU configurations (also referred to as allocations in the IEEE 802.11ax draft specification) in an OFDMA scheme. The available bandwidth is 20 MHz. Allocation of RUs means that each STA which is provided with an UL transmission grant is given one or more RUs on which to transmit. The allocation, in some embodiments, pertains to DL transmission by an AP or other STA. The duration of the subsequent data transmission from a STA will be for one PPDU, that is, one packet interval. For example, STA 102 UL Data 420 comprises a PPDU (discussed below with respect to FIG. 4). An RU, in an exemplary embodiment, represents 26 contiguous tones or subcarriers. Nine 26-subcarrier RUs represent a total of 234 subcarriers. In one configuration of a 20 MHz bandwidth, STA 102 may be provided with an allocation which represents the entire 20 MHz band. In some embodiments, tone index 0 is not included in the configurations/allocations discussed herein. As an example of operation, after a joint sounding and data epoch establishes a map of channels, STA 102 is provided RU 221, STA 106 is provided RU 222 and STA 104 is provided RU 229 (all for UL, all for DL, or for various permutations thereof among STAs 102, 104, and 106). In another example, STA 102 is provided with both RU 221 and RU 229 for UL and/or DL data transfers. The RUs allocated to a particular STA are not required to be contiguous in frequency. In some embodiments, the RU allocations for UL and DL per STA are the same. In some embodiments the UL and DL resource unit allocations may be different.

Channel Map

Table 1 illustrates variables holding values obtained during the sounding of the joint sounding and data epoch. Table 1, which may be referred to as a sounding table, is the basis of a channel map. The channel map may also be referred to as a channel map table. Table 1 shows various cells labelled with variable names. For simplicity of presentation, representative labelled table cells are provided as well as unlabeled cells (indicated by one or more ellipses " . . . " indicating omitted cells, rows and/or columns) to provide context. The topmost row indicates RU labels. The leftmost column indicates STA labels. Index variables i, k, q, and m are used to represent an arbitrary $i^{th}$ RU, an arbitrary $k^{th}$ STA, a direction q (UL or DL), a time T, and a channel sounding measurement or quantized value corresponding to those, $CSI_{kiq}$. CSI effectively includes an indication of the likelihood of efficient data transmission through the channel. CSI is not limited, for example, to channel gain, phase and multipath structure. As an example, for a configuration 220 with nine RUs and an example of nine STAs in the vicinity of AP 140 with data to send or receive, the number of CSI values to fully the populate the table will be 9*9*2 (the 2 is for UL and DL). For the purpose of illustration, each CSI value can be compared with a minimal acceptable threshold. This can be done before populating the table, after the populating the table, or when using the table to determine an allocation, for example.

TABLE 1

CSI-Based Sounding Table

| $t = T_m$ | RU 221 | RU 222 | ... | $RU_i$ | ... | RU 229 |
|---|---|---|---|---|---|---|
| STA 102 | $CSI_{11q}$ | $CSI_{12q}$ | ... | $CSI_{1iq}$ | ... | $CSI_{19q}$ |
| ... | | | | | | |
| $STA_k$ | $CSI_{k1q}$ | $CSI_{k2q}$ | | $CSI_{kiq}$ | | $CSI_{k9q}$ |
| ... | | | | | | |
| STA 106 | $CSI_{91q}$ | $CSI_{92q}$ | | $CSI_{9iq}$ | | $CSI_{99q}$ |

Table 2 is a populated version of Table 1 with each CSI value instanced by an example SNR value. Table 2, like table 1, is a sounding table. SNR can be estimated, for example, by taking a ratio of an RSSI measurement with a noise floor measurement. The top row and left column labels remain unchanged, but the interior cells of the table now hold example values. The values shown are in decibels (dB). In some embodiments, the values are RSSI values (for example, corresponding to linear power measurements) or represent complex numbers (corresponding to channel gain and phase measurements associated with a baseband representation of signals in I and Q format). The exemplary values in Table 2 represent CSI values that have been measured or sounded; arbitrary indices are no longer needed, so indices are replaced with instance values (or omitted in the case of $RU_i$).

TABLE 2

SNR-Based Sounding Table

| $t = T_1 = 0$ | RU 221 | RU 222 | ... | RU 229 |
|---|---|---|---|---|
| STA 102 | 20 dB (UL) | 20 dB (UL) | ... | −3 dB (UL) |
|  | 5 dB (DL) | 20 dB (DL) |  | −1 dB (DL) |
| ... |  |  |  |  |
| STA 104 | 20 dB (UL) | 20 dB (UL) |  | 20 dB (UL) |
|  | 10 dB (DL) | 20 dB (DL) |  | 10 dB (DL) |
| ... |  |  |  |  |
| STA 106 | −3 dB (UL) | 10 dB (UL) |  | −3 dB (UL) |
|  | −3 dB (DL) | 10 dB (DL) |  | −3 dB (DL) |

Table 3 is a channel map table obtained as a processed version of Table 2 after comparing with a threshold. For example, an SNR threshold may indicate that an SNR of greater than 3 dB is required for adequate QoS performance. The threshold used depends on the application; different applications have different QoS requirements, generally. Examples of application characteristics are: real time, not real time, streaming, interactive, voice, images, and/or file data, for example. Different STAs generally use different applications during a given time interval. If the application changes, Table 2 would not change, but Table 3 could change.

TABLE 3

Channel Map Table

| $t = T_1 = 0$ | RU 221 | RU 222 | ... | RU 229 |
|---|---|---|---|---|
| STA 102 | Good (UL) | Good (UL) | ... | Unusable (UL) |
|  | Good (DL) | Good (DL) |  | Unusable (DL) |
| ... |  |  |  |  |
| STA 104 | Good (UL) | Good (UL) |  | Good (UL) |
|  | Good (DL) | Good (DL) |  | Good (DL) |
| ... |  |  |  |  |
| STA 106 | Unusable (UL) | Good (UL) |  | Unusable (UL) |
|  | Unusable (DL) | Good (DL) |  | Unusable (DL) |

Resource Allocation

From Table 3, a possible resource allocation at time $t=T_1=0$ is {(STA 102, RU 221), (STA 104, RU 229), (STA 106, RU 222)}. The resource allocation, in some embodiments is a set of two-tuples or pairs as shown in this example. One pair is determined for each STA with data to send or receive. More than one RU, in some embodiments, is assigned to a given STA. If STA 102 has no data to send or receive, and STA 104 can use more than one RU, an example resource allocation would be {(STA 104, RU 229, RU 221), (STA 106, RU 222)}.

Figure 3:
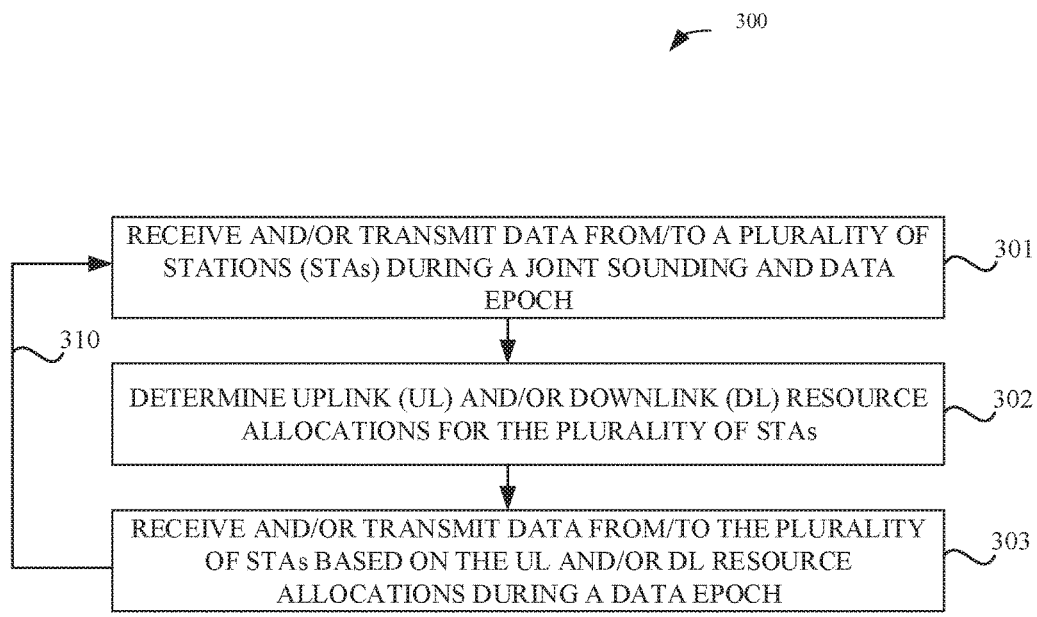
FIG. 3 illustrates exemplary logic for using a joint sounding and data epoch to determine UL and/or DL resource allocations, according to some embodiments.

FIG. 3 illustrates exemplary logic for determining UL and DL resource allocations while transferring data. At 301, an AP receives and/or transmits data from or to a plurality of STAs during a joint sounding and data epoch. At 302, the AP uses channel estimates, RSSI estimates, SNR values, and/or channel quality estimates obtained during the joint sounding and data epoch to create a channel map. From the channel map, the AP determines UL and/or DL resource allocations for the plurality of STAs. At 303, during a data epoch, the AP transmits DL data to the STAs based on the resource allocations and triggers UL data from the STAs based on the resource allocations. The logic will return to 301 (as shown by arrow 310) with sufficient frequency to keep the knowledge of the channel fresh, the channel map up-to-date, and the corresponding resource allocations suitable for high rates of data transmission with low error rates.

Time Series Example

Figure 4:
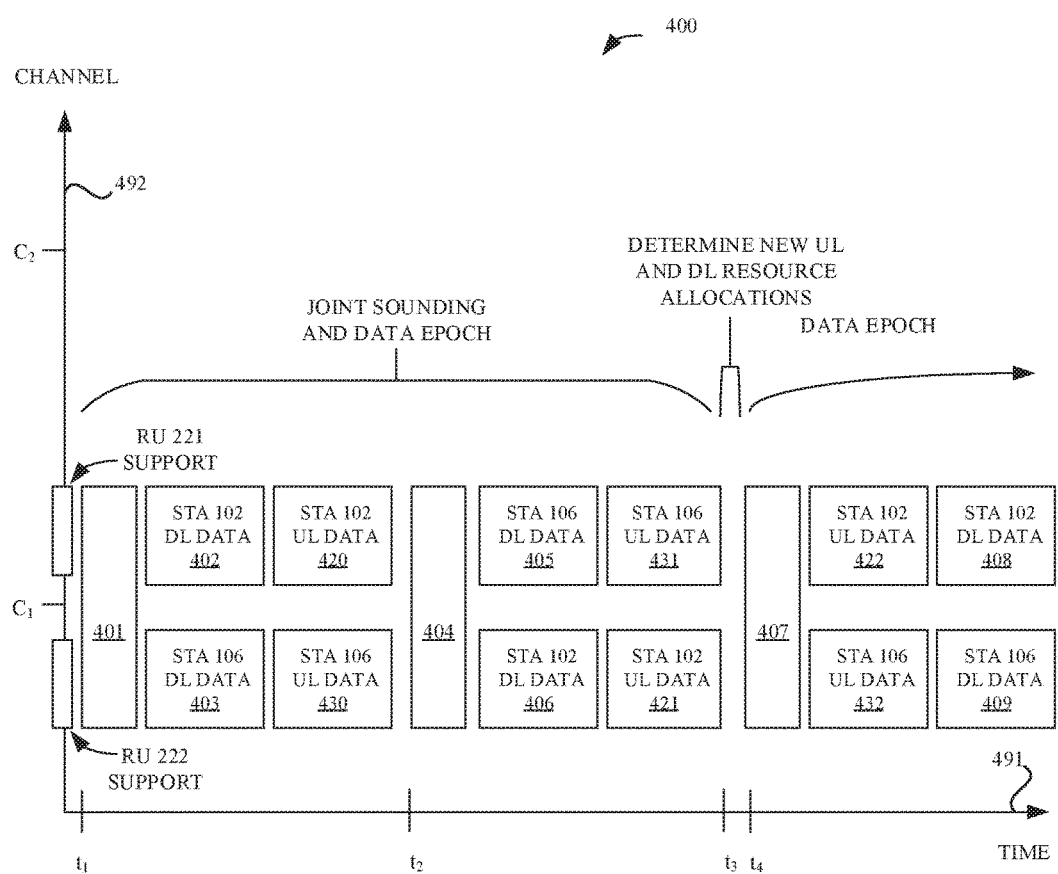
FIG. 4 illustrates an exemplary time series involving AP and STA transmissions according to some embodiments. An exemplary joint sounding and data epoch and an exemplary data epoch are indicated in the figure.

FIG. 4 illustrates UL and DL transmissions during a joint sounding and data epoch and during a data epoch. Axis 491 indicates time. Axis 492 indicates a WLAN channel. For example, $C_1$ and $C_2$ are the respective centers of 20 MHz channels, in some embodiments. A joint sounding and data epoch extends from a time $t_1$ to a time $t_3$. Trigger frame 401 (labelled "401") indicates AP 140 sending a trigger frame to STAs 102 and 106. Subsequent to the trigger frame 401, the AP 140 sends DL data 402 to the STA 102 on, for example, RU 221 (see FIG. 2). The position of the subcarriers associated with the RU 221 on the axis 492 is shown schematically (not to scale) with the annotation "RU 221 support" (similarly for RU 222). At the same time, the AP 140 sends DL data 403 to the STA 106 on RU 222. The STAs subsequently send data indicated by 420 and 430 each using the RUs they received on (RU 221 for STA 102, RU 222 for STA 106).

The AP 140 can now, at $t_2$, populate the channel map for STA 102 with an indication at RU 221 (UL) and STA 106 with an indication at RU 222 (UL). The indication may include several bits of information, or, in some embodiments, is simply a single bit based on comparing a measurement with a threshold. For example, an observed SNR can be compared with a minimal acceptable SNR. If the observed SNR is greater than the minimum acceptable SNR, the channel map can be marked with a notation or indication "Good," "True," or a "1", for example. Alternatively, an estimated bit error rate can be compared with a maximum acceptable bit error rate. If the estimated bit error exceeds the maximum acceptable bit error, the channel map can be marked with a notation or indication "Unusable," "False," or a "0", for example.

Using trigger frame 404 at time $t_2$, the AP 140 swaps the RU assignments, sends data, and also requests channel sounding reports. These actions are indicated by the message 404 in FIG. 4. STA 106 then receives DL data 405 on RU 221 and sends UL data 431 along with a piggy-backed sounding report in UL data message 431 on RU 221. Also, subsequent to 404, STA 102 then receives DL data 406 and sends UL data 421 along with a piggy-backed sounding report in UL data message 421. The AP 140 can now, at $t_3$, populate the channel map for STA 106 at RU 221 (UL). The AP 140 also populates the channel map for STA 106 at RU 221 (DL) and RU 222 (DL) based on the received sounding report piggy-backed with the data 431. Also, the AP 140 can, at $t_3$, populate the channel map for STA 102 at RU 222 (UL). Similarly to entries for STA 106, the AP 140 populates the channel map for STA 102 at RU 222 (DL) and RU 221 (DL) based on the received sounding report piggy-backed with the data 421.

The AP 140 then determines new UL and DL resource allocations between times $t_3$ and $t_4$ as indicated in FIG. 4. A data epoch now commences. Sounding is complete for the time being. Using trigger frame 407 at time $t_4$, the AP 140 transmits a trigger message allocating RU 221 to STA 102 and RU 222 to STA 106. This is followed by UL data 422 from STA 102 on RU 221 and STA 102 then receives DL data 408 on RU 221. STA 106 sends UL data 432 on RU 222 and receives DL data 409 on RU 222. The data epoch continues up until passage of an approximated coherence time, and then another joint sounding and data epoch will be initiated by the AP 140.

Logic for First and Second Joint Sounding and Data Epochs

Figure 5:
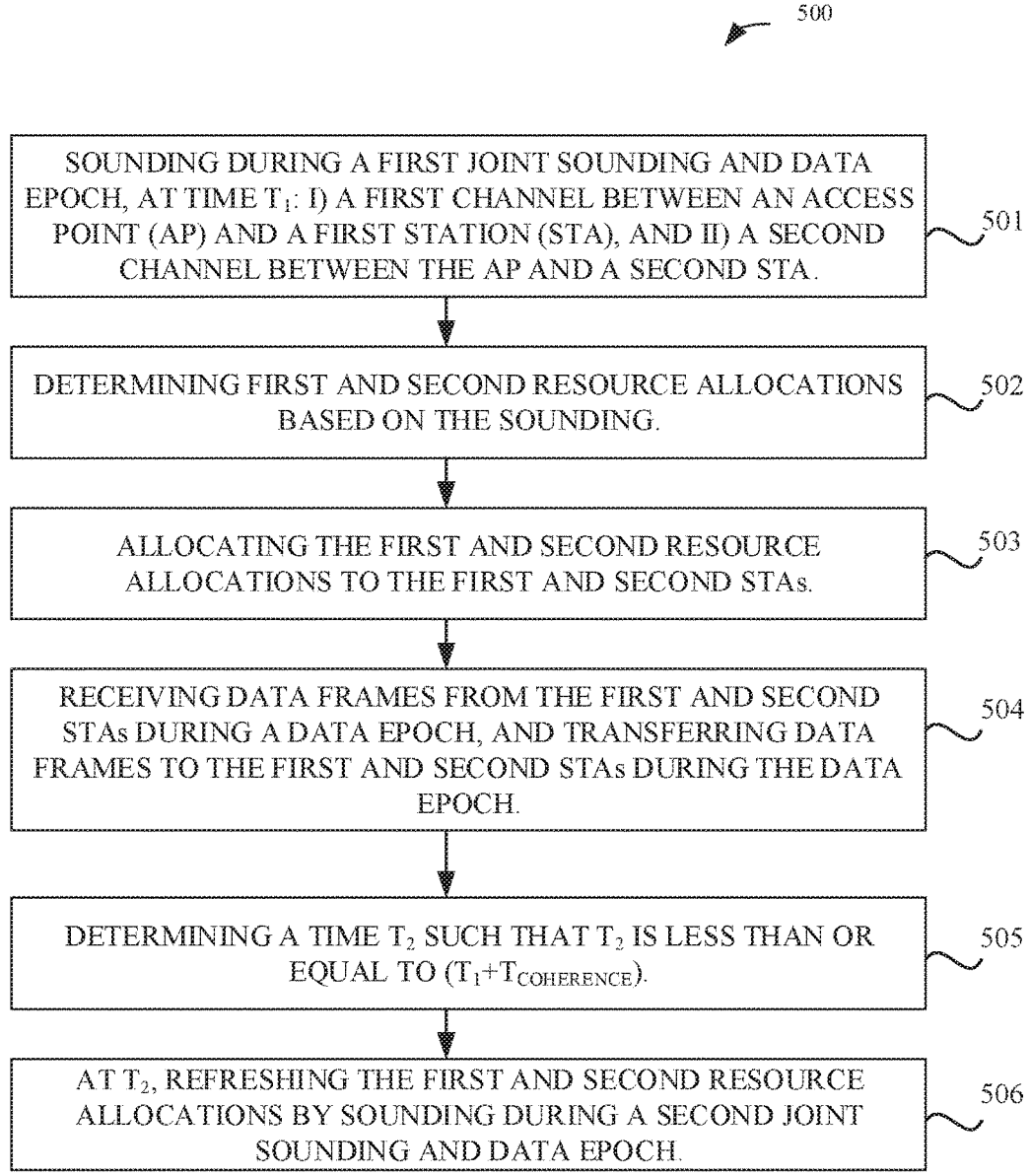
FIG. 5 illustrates exemplary logic for first and second joint sounding and data epochs, according to some embodiments.

FIG. 5 illustrates exemplary logic for a joint sounding and data epoch, followed by a data epoch, followed by a subsequent joint sounding and data epoch. At a time $T_1$ as shown at 501, an AP sounds channels between the AP and two STAs. Generally, a "channel" refers to both UL and DL directions at several available RU configurations. For example, FIG. 5 applied to RU configuration 220 determines the UL and DL entries of the channel map for one or more of the RUs 221 . . . 229 for the first STA when "sounding . . . a first channel." Since sounding also recognizes interference conditions, a channel associated with a given RU may be good for UL yet bad for DL, even though the subcarriers represented by a given RU of the available RUs are the same. This is because interference at a given frequency is a function of physical location (position in space), and the AP and the STA are at different physical locations.

At 502, the AP determines RUs to be assigned to the first and second STA based on the channel map developed at 501. At 503, the AP allocates the UL assignments to the STAs for UL data transmission and uses the DL assignments of the determined allocation for DL transmissions to the STAs. The throughput at this point is good, on the average, because the available RUs in the WM have been sounded for the STAs. Based on the sounding, the RUs are then used so as to avoid interference and exploit channels with good link conditions (low interference) and/or low radio path attenuation. Low attenuation means that the intended signal arrives at the receiver with adequate energy for successful demodulation, given noise conditions are normal. At 503, the AP allocates the allocations determined at 502 to the first and second STAs. Allocation means that the STAs are informed of RUs to use for UL transmission, and the STAs are informed of RUs on which to expect DL transmissions. At 503, the joint sounding and data epoch is complete.

At 504, the AP transfers data to the first STA and/or receives data from the first STA. Similarly, data is transferred to and/or from the second STA. 504 commences the data epoch. Sounding is complete and is not performed at 504. At 505, during the data epoch, the STA determines a next time, $T_2$, at or before which another joint sounding and data epoch will commence. The AP uses a value, $T_{COHERENCE}$, to do this. $T_{COHERENCE}$, may be a value established by trial and error, from a configuration table loaded in the AP at manufacturing time or by a firmware update, or based on an algorithm which estimates the time variation of power statistics (such as SNR fluctuations in time) of the WM. One indication of a high coherence time is a low Doppler shift of an observed signal. At 506, a second joint sounding and data epoch commences. The resource allocations are refreshed. When a new interferer arrives, or an old interferer departs, a new STA arrives or an old STA departs the vicinity of the AP, the channel map is accordingly re-sized and re-populated to create a second channel map. Following the second joint sounding and data epoch, a second data epoch will commence based on the second channel map (not described in FIG. 5).

Representative Exemplary Apparatus

Figure 6:
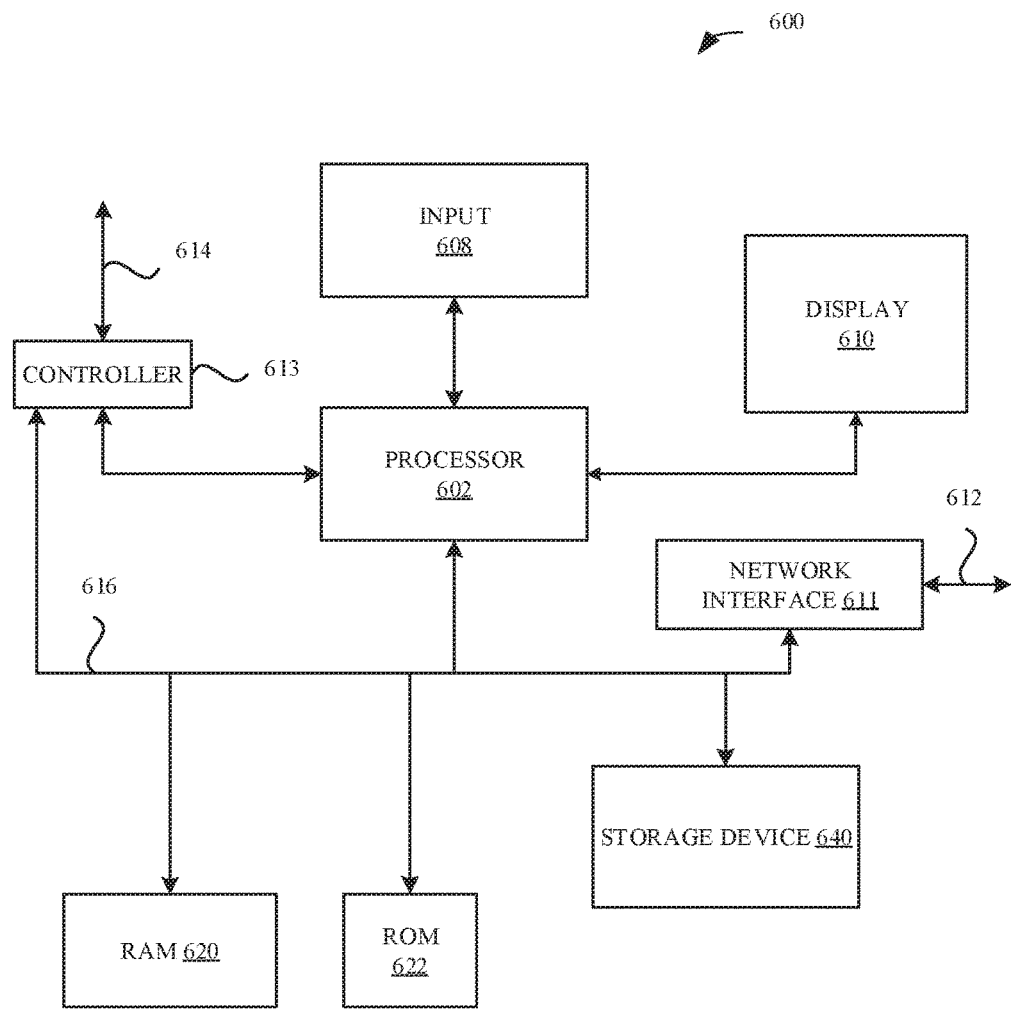
FIG. 6 illustrates an exemplary apparatus for implementation of the embodiments disclosed herein.

FIG. 6 illustrates in block diagram format an exemplary computing device 600 that can be used to implement the various components and techniques described herein, according to some embodiments. In particular, the detailed view of the exemplary computing device 600 illustrates various components that can be included in the AP 140 illustrated in FIGS. 1 and 2. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 (screen display) that can be controlled by the processor 602 to display information to the user (for example, information relating to incoming, outgoing, or active communication session). A data bus 616 can facilitate data transfer between at least a storage device 640, the processor 602, and a controller 613. The controller 613 can be used to interface with and control different equipment through an equipment control bus 614. The computing device 600 can also include a network/bus interface 611 that couples to a data link 612. In the case of a wireless connection, the network/bus interface 611 can include wireless circuitry, such as a wireless transceiver and/or baseband processor.

The computing device 600 also includes a storage device 640, which can comprise a single storage or a plurality of storages (e.g., hard drives), and includes a storage management module that manages one or more partitions within the storage device 640. In some embodiments, storage device 640 can include flash memory, semiconductor (solid state) memory or the like. The computing device 600 can also include a Random Access Memory ("RAM") 620 and a Read-Only Memory ("ROM") 622. The ROM 622 can store programs, utilities or processes to be executed in a non-volatile manner. The RAM 620 can provide volatile data storage, and stores instructions related to the operation of the computing device 600.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method of determining first and second resource allocations between an access point (AP) and a first station (STA) and a second STA, the method comprising:
 by the AP:
  sounding during a first joint sounding and data epoch: i) a first channel between the AP and the first STA, and ii) a second channel between the AP and the second STA;

exchanging data during a first data epoch, wherein the first STA and the second STA use respectively first and second resource allocations, and wherein the first and second resource allocations are based on the sounding during the first joint sounding and data epoch; and refreshing the first and second resource allocations based at least in part on sounding during a second joint sounding and data epoch, wherein the first joint sounding and data epoch begins at a first time, the second joint sounding and data epoch begins at a second time, and a difference between the second time and the first time is not greater than a channel coherence time, and wherein the sounding comprises:
sending to each STA downlink (DL) medium access control (MAC) data frames comprising DL data,
receiving from each STA composite uplink (UL) MAC frames that combine UL data with DL measurement reports determined based on measurements of the DL data in the DL MAC data frames,
estimating DL paths to each STA based on the received DL measurement reports, and
estimating UL paths from each STA based on measurements of the UL data in the received composite UL MAC frames.

2. The method of claim 1, wherein the refreshing comprises:
estimating a speed through physical space of the first STA; and
estimating the channel coherence time using the speed.

3. The method of claim 1, wherein the sounding during the first joint sounding and data epoch comprises:
requesting, using a first request frame, a first report from the first STA; and
receiving, from the first STA, a first composite UL MAC frame, wherein the first composite UL MAC frame comprises the first report and first UL data;
requesting, using a second request frame, a second report from the second STA; and
receiving, from the second STA, a second composite UL MAC frame, wherein the second composite UL MAC frame comprises the second report and second UL data.

4. The method of claim 3, wherein the first request frame comprises a beamforming report poll, and the first report comprises a beamforming feedback frame.

5. The method of claim 3, wherein the sounding during the first joint sounding and data epoch further comprises:
determining a first DL resource allocation for the first STA based at least in part on the first report.

6. The method of claim 5, wherein the exchanging data comprises:
sending, using the first DL resource allocation, one or more DL MAC data frames to the first STA.

7. The method of claim 6, wherein the exchanging data further comprises:
receiving, responsive to the one or more DL MAC data frames, one or more corresponding acknowledgement frames from the first STA.

8. An access point (AP) comprising:
a memory; and
one or more processors, wherein the memory includes instructions that, when executed by a processor of the one or more processors, cause the AP to perform operations comprising:
sounding during a first joint sounding and data epoch:
i) a first channel between the AP and a first station (STA), and ii) a second channel between the AP and a second STA,
exchanging data during a first data epoch, wherein the first STA and the second STA use respectively first and second resource allocations, and wherein the first and second resource allocations are based on the sounding during the first joint sounding and data epoch, and
revising at least one of the first and second resource allocations based at least in part on sounding during a second joint sounding and data epoch,
wherein the first joint sounding and data epoch begins at a first time, the second joint sounding and data epoch begins at a second time, and a difference between the second time and the first time is not greater than a channel coherence time, and
wherein the sounding comprises:
sending, to each STA, downlink (DL) medium access control (MAC) data frames comprising DL data,
receiving, from each STA, composite uplink (UL) MAC frames that combine UL data with DL measurement reports determined based on measurements of the DL data in the DL MAC data frames,
estimating DL paths to each STA based on the received DL measurement reports, and
estimating UL paths from each STA based on measurements of the UL data in the received composite UL MAC frames.

9. The AP of claim 8, wherein the revising comprises:
estimating a speed of the first STA through physical space; and
estimating the channel coherence time based at least in part on the speed.

10. The AP of claim 8, wherein the sounding during the first joint sounding and data epoch comprises:
requesting, using a first request frame, a first report from the first STA; and
receiving, from the first STA, a first composite UL MAC frame, wherein the first composite UL MAC frame comprises the first report and first UL data;
requesting, using a second request frame, a second report from the second STA; and
receiving, from the second STA, a second composite UL MAC frame, wherein the second composite UL MAC frame comprises the second report and second UL data.

11. The AP of claim 10, wherein the first request frame comprises a beamforming report poll, and the first report comprises a beamforming feedback frame.

12. The AP of claim 10, wherein the sounding during the first joint sounding and data epoch further comprises:
determining a first DL resource allocation for the first STA based at least in part on the first and second reports.

13. The AP of claim 12, wherein the exchanging data comprises:
sending, using the first DL resource allocation, one or more DL MAC data frames to the first STA.

14. The AP of claim 13, wherein the exchanging data further comprises:
receiving, responsive to the one or more DL MAC data frames, one or more corresponding acknowledgement frames from the first STA.

15. A non-transitory computer readable medium storing instructions that, when executed by one or more processors of an access point (AP), cause the AP to perform operations comprising:
- sounding during a first joint sounding and data epoch: i) a first channel between the AP and a first station (STA), and ii) a second channel between the AP and a second STA,
- exchanging data during a first data epoch, wherein the first STA and the second STA use respectively first and second resource allocations, and wherein the first and second resource allocations are based on the sounding during the first joint sounding and data epoch, and
- revising at least one of the first and second resource allocations based at least in part on sounding during a second joint sounding and data epoch,
- wherein the first joint sounding and data epoch begins at a first time, the second joint sounding and data epoch begins at a second time, and a difference between the second time and the first time is not greater than a channel coherence time, and
- wherein the sounding comprises:
  - sending to each STA downlink (DL) medium access control (MAC) data frames comprising DL data,
  - receiving from each STA composite uplink (UL) MAC frames that combine UL data with DL measurement reports determined based on measurements of the DL data in the DL MAC data frames,
  - estimating DL paths to each STA based on the received DL measurement reports, and
  - estimating UL paths from each STA based on measurements of the UL data in the received composite UL MAC frames.

16. The non-transitory computer readable medium of claim 15, wherein the revising comprises:
- estimating a speed of the first STA through physical space; and
- estimating the channel coherence time based at least in part on the speed.

17. The non-transitory computer readable medium of claim 15, wherein the sounding during the first joint sounding and data epoch comprises:
- requesting, using a first request frame, a first report from the first STA; and
- receiving, from the first STA, a first composite UL MAC frame, wherein the first composite UL MAC frame comprises the first report and first UL data;
- requesting, using a second request frame, a second report from the second STA; and
- receiving, from the second STA, a second composite UL MAC frame, wherein the second composite UL MAC frame comprises the second report and second UL data.

18. The non-transitory computer readable medium of claim 17, wherein the first request frame comprises a beamforming report poll, and the first report comprises a beamforming feedback frame.

19. The non-transitory computer readable medium of claim 17, wherein the sounding during the first joint sounding and data epoch further comprises:
- determining a first DL resource allocation for the first STA based at least in part on the first and second reports.

20. The non-transitory computer readable medium of claim 15, wherein the exchanging data comprises:
- sending, using the first DL resource allocation, one or more DL MAC data frames to the first STA; and
- receiving, responsive to the one or more DL MAC data frames, one or more corresponding acknowledgement frames from the first STA.

* * * * *

UNITED STATES PATENT AND TRADEMARK OFFICE
CERTIFICATE OF CORRECTION

PATENT NO. : 10,715,288 B2
APPLICATION NO. : 15/590960
DATED : July 14, 2020
INVENTOR(S) : Shani et al.

It is certified that error appears in the above-identified patent and that said Letters Patent is hereby corrected as shown below:

In the Specification

At Column 10, Line 25: "a time T," should read -- a time $T_m$, --.

Signed and Sealed this
Twenty-seventh Day of October, 2020

Andrei Iancu
*Director of the United States Patent and Trademark Office*